US012781394B2

(12) United States Patent
Ekici

(10) Patent No.: US 12,781,394 B2
(45) Date of Patent: Nov. 3, 2026

(54) DISSOLVABLE THREAD AND ARTICLE CONTAINING SAME

(71) Applicant: J. & P. COATS, LIMITED, Glasgow (GB)

(72) Inventor: Erkan Ekici, Nilüfer (TR)

(73) Assignee: J. & P. Coats, Limited, Glasgow (GB)

( * ) Notice: Subject to any disclaimer, the term of this patent is extended or adjusted under 35 U.S.C. 154(b) by 772 days.

(21) Appl. No.: 18/044,721

(22) PCT Filed: Sep. 3, 2021

(86) PCT No.: PCT/EP2021/074427
§ 371 (c)(1),
(2) Date: Mar. 9, 2023

(87) PCT Pub. No.: WO2022/053414
PCT Pub. Date: Mar. 17, 2022

(65) Prior Publication Data

US 2023/0392301 A1 Dec. 7, 2023

Related U.S. Application Data

(60) Provisional application No. 63/076,004, filed on Sep. 9, 2020.

(51) Int. Cl.

| | |
|---|---|
| ***D02G 3/04*** | (2006.01) |
| ***B09B 3/70*** | (2022.01) |
| ***C08J 11/10*** | (2006.01) |
| ***D02G 3/44*** | (2006.01) |
| *B09B 101/85* | (2022.01) |

(52) U.S. Cl.
CPC ................. *D02G 3/04* (2013.01); *B09B 3/70* (2022.01); *C08J 11/10* (2013.01); *D02G 3/44* (2013.01); *B09B 2101/85* (2022.01); *C08J 2329/04* (2013.01); *C08J 2333/02* (2013.01); *C08J 2367/04* (2013.01); *C08J 2397/02* (2013.01); *C08J 2429/04* (2013.01); *C08J 2433/02* (2013.01); *C08J 2467/04* (2013.01); *C08J 2497/02* (2013.01); *D10B 2201/02* (2013.01); *D10B 2321/06* (2013.01); *D10B 2321/08* (2013.01); *D10B 2331/041* (2013.01); *D10B 2401/024* (2013.01); *D10B 2401/063* (2013.01)

(58) Field of Classification Search
USPC ........................................................... 521/41
See application file for complete search history.

(56) References Cited

U.S. PATENT DOCUMENTS 2,714,758 A * 8/1955 Woodson, Jr. ........... D02G 3/46 57/239
5,577,307 A * 11/1996 Itoi ........................ D03D 11/00 28/168

FOREIGN PATENT DOCUMENTS

| | | | | |
|---|---|---|---|---|
| EP | 0439339 B1 * | 10/1997 | | A61L 15/44 |
| GB | 775387 A | 5/1957 | | |
| JP | H0633330 A | 2/1994 | | |
| JP | 2003003650 A | 1/2003 | | |
| WO | 2009/098585 A2 | 8/2009 | | |
| WO | WO-2019202608 A1 * | 10/2019 | | D02G 3/406 |

OTHER PUBLICATIONS

The International Search Report and written opinion mailed Mar. 1, 2022; PCT/EP2021/074427.

* cited by examiner

*Primary Examiner* — Terressa Boykin
(74) *Attorney, Agent, or Firm* — MaxGoLaw PLLC

(57) ABSTRACT

A recyclable thread or yarn having a dissolvable fiber and an insoluble fiber is provided and incorporated into a woven article, garment or textile. The dissolvable fiber and the insoluble fiber are twisted to form the thread or yarn. The dissolvable fiber may be a synthetic water soluble polymer and may dissolve in water at between 60° C. and 100° C. The insoluble fiber may be cotton such as extra-long staple (ELS) cotton or Supima cotton. A process for recycling a woven article, garment or textile made with the recyclable thread or yarn is also provided. The process for recycling a woven article, garment or textile made with the recyclable thread or yarn includes subjecting the woven article, garment or textile in water to a condition to cause said dissolvable fiber to lose long range order to form a slurry or solution.

18 Claims, 6 Drawing Sheets

DISSOLVABLE THREAD AND ARTICLE CONTAINING SAME

CROSS-REFERENCE TO RELATED APPLICATION

This application claims priority benefit of U.S. Provisional Patent Application Ser. No. 63/076,004 filed Sep. 9, 2020, which is incorporated herein by reference.

FIELD OF THE INVENTION

The present invention in general relates to the field of textiles, and more particularly to a dissolvable thread and recyclable articles made thereof.

BACKGROUND OF THE INVENTION

The importance of recycling textiles is increasingly being recognized. Worldwide over 80 billion garments are produced annually. In the United States alone, the U.S. Environmental Protection Agency (EPA) has determined that approximately 16 million tons of textile municipal solid waste (MSW) was generated in 2015, which is about 6.1% of total MSW generation. The average person discards 70 pounds of clothes in their lifetime. Furthermore, the fast fashion industry, which encourages styles to be changed often, generates considerable pollution and has a sizeable negative impact on climate change. The rate of recycled textiles derived from clothing and footwear was 14.2%, while the recovery for sheets and pillowcases was 16.3% for the year 2015. Therefore, textile recycling is a significant challenge that needs to be addressed to move closer to a zero landfill society.

Once in landfills, natural fibers can take hundreds of years to decompose while releasing methane and carbon dioxide gas into the atmosphere. Additionally, synthetic textiles are designed not to decompose and in a landfill may release toxic substances into groundwater and surrounding soil.

The environmental benefits of textile recycling include decreases in landfill space requirements, bearing in mind that synthetic fiber products do not decompose and that natural fibers may release greenhouse gasses, the avoided use of virgin fibers, the reduced consumption of energy and water, pollution avoidance, and a lessened demand for dyes. Therefore, the recycling of textiles reduces people's carbon footprint and energy consumption, helps to preserve clean air, and conserve water and woodlands. In addition, textile recycling drives the economy by creating jobs, funding charitable initiatives, providing revenue for recycling agencies, promoting small business, and providing affordable clothing opportunities.

For textiles to be recycled, there are fundamental differences between natural and synthetic fibers. For natural textiles the incoming unwearable material is sorted by type of material and color. Color sorting results in a recycled fabric that does not need to be re-dyed thereby saving energy and avoiding pollutants. Textiles are then pulled into fibers or shredded, sometimes introducing other fibers into the yarn. Materials are shredded or pulled into fibers. Depending on the end use of the yarn, other fibers may be incorporated. The yarn is then cleaned and mixed through a carding process, and the yarn is re-spun and ready for subsequent use in weaving or knitting. However, some fibers are not spun into yarns, and are compressed for textile filling such as in mattresses. In the case of polyester-based textiles, garments are shredded and then granulated for processing into polyester chips. The polyester chips are subsequently melted and used to create new fibers for use in new polyester fabrics.

Currently, despite the great need to recycle used clothing the process for recycling clothing often involves the process of manually cutting a garment apart with scissors to separate out the labels, zipper, buttons, metal studs, from the material fibers to be recovered.

Thus, there exists a need for fabrics that provide for a less labor intensive method to separate material fibers from non-fiber features of garments during recycling.

SUMMARY OF THE INVENTION

The present invention provides a recyclable thread or yarn incorporated into a woven article, garment or textile that includes a dissolvable fiber and an insoluble fiber. The dissolvable fiber and the insoluble fiber are twisted to form the thread or yarn. According to embodiments, the dissolvable fiber is a synthetic water soluble polymer. According to embodiments, the dissolvable fiber dissolves in water at between 60° C. and 100° C. According to embodiments, the insoluble fiber is cotton such as extra-long staple (ELS) cotton or Supima cotton. The present invention also provides a process for recycling a woven article, garment or textile made with the an inventive recyclable thread or yarn, in which the woven article, garment or textile is subjected in water to a condition to cause said dissolvable fiber to lose long range order to form a slurry or solution.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1A:
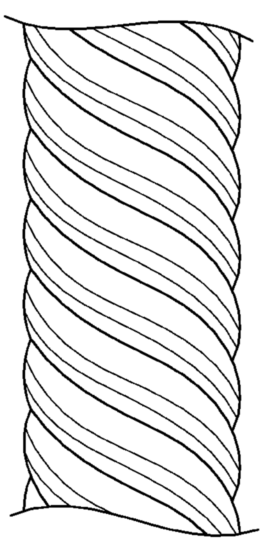
FIG. 1A (PRIOR ART)
FIGS. 1A-1C illustrate prior art examples of an S-twist yarn, a Z-twist yarn, and a 2-ply S/Z hybrid twist, respectively.

The present invention has utility as a disposable thread for fabrics that provides for a less labor intensive method to separate material fibers from non-fiber features of garments during recycling. Fabrics formed using embodiments of the disposable thread may illustratively include woven, knitted, warp knitted, and non-wovens. Embodiments of the inventive thread are formed as a blend of two textile fibers, one fiber being a dissolvable fiber illustratively including polyvinyl alcohol (PVA) and a second non-soluble fiber being a natural fiber illustratively including cotton and/or a synthetic fiber. Water-dissolvable fibers are designed to dissolve in water, at or above a specified temperature. The soluble fibers and non-soluble fibers are mixed in a mixer in fiber form at a required blend ratio, and then go through carding, drawing, and roving process to create embodiments of the inventive thread. By selection of a dissolution temperature that is above the intended usage temperature of the resulting fabric, end user experience is that of a conventional fabric, yet when discarded the garment is amenable to efficient recycling.

In embodiments of the invention fiber blends of water-dissolvable fiber to one or more non-soluble fibers being natural fiber or synthetic fiber are combined in a predefined ratio and are lubricated and dyed to form a yarn. Garments and textiles formed with embodiments of the disposable thread have a useable service life until they are washed at an elevated water temperature for example, above of 90° C. or 95° C. at which time the textile or garment has the soluble portion of the yarn dissolve and the non-soluble part of the yarn/thread remain part of the construction of the textile or garment. However, following dissolution of the soluble portion of the yarn, the construction of the textile or garment will be weakened, and will be easier easy to tear apart or the remove features illustratively including zippers, buttons, and other fasteners.

In specific inventive embodiments a single thread is a blend of soluble and insoluble fibers, for example a cotton fiber is blended end to end with a soluble fiber. As a result, a small volume of sewing thread upon activating releases the sewn article into pieces.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Water soluble fibers operative herein are limited only by compatibility with the insoluble fiber and having a solubility that is consistent with the resulting fabric and garment usage. It is appreciated that the fabric usage in some embodiments includes machine washing.

Water dissolvable fibers operative herein may be formed of synthetic water soluble polymers and natural water soluble polymers. Examples of synthetic water soluble polymers illustratively include polydioxanone, poly(ethylene glycol) (PEG), polyvinyl pyrrolidone (PVP), polyvinyl alcohol (PVA), polyacrylic acid (PAA), polyglycolic acid, polyacrylamides, N-(2-Hydroxypropyl) methacrylamide (HPMA), divinyl ether-maleic anhydride (DIVEMA), polyoxazoline, poly(caprolactone), polyphosphates, and polyphosphazenes. Examples of natural water soluble polymers illustratively include plant ucilage, water-soluble hemicellulose, inulin, alginates, dextrins, maltodextrins, galactommannans, arabanogalactans, beta glucans, cellulose ethers, pectins, pectic material, dextran, and partially hydrolyzed products thereof or mixtures thereof. Dissolvable fibers used in specific embodiments of invention have weights of from 100 dtex to 3000 dtex.

In specific inventive embodiments factors that affect solubility include the nature of molecules, molecular weight, fiber diameter, overcoatings to stabilize, derivatization to replace groups such as hydroxyl, carboxyl, amine, with protecting groups.

In specific inventive embodiments the relative fiber diameters between the dissolvable and non-soluble fiber diameters is in a ratio between 0.1-9:1. It is further appreciated that similarly sized fiber diameters or yarn diameters facilitate twisting to form a final yarn amenable to fashioning into a woven article.

In specific inventive embodiments conditions of solubility of the soluble fibers may be chemically engineered or controlled at the molecular level by taking into account the nature of the molecules by derivatizing them to replace groups illustratively including hydroxyl, carboxyl, amine, with protecting groups. A protective group (also referred to as "protecting group") is a reversibly formed derivative of an existing functional group in a molecule. The protective group is temporarily attached to decrease reactivity so that the protected functional group does not react under synthetic conditions to which the molecule is subjected in one or more subsequent steps. As an example, whereas amines are nucleophiles and react with electrophiles, the amino group is no longer nucleophilic after being converted to a carbamate. Protecting an amine as a carbamate therefore enables other functional groups to undergo selective reactions with electrophiles whereby the carbamate (protected amino group) is left intact. The conditions for the protection step and deprotection step and the nature of the protective group itself are designed to not interfere with other functional groups present in the molecule.

In still other inventive embodiments, the solubility of a fiber is controlled by coating a highly soluble polymer with a coating that forms a barrier to dissolution, with the barrier properties of the coating being compromised by events such as heating the coating above a transition temperature such as the glass transition temperature, Tg, or the melting temperature, Tm for the coating. In still other embodiments, the coating is catalytically degraded by exposure to a synthetic or enzymatic catalyst.

It is appreciated that in specific inventive embodiments a plurality of base material staple fibers that are combined with dissolvable fibers to create the disposable thread that also includes insoluble fibers that illustratively include cotton, silk, modal, acrylics, a blend of cotton and polyester, a blend of polyester and viscose, a blend of poly(trimethylene terephthalate) and cotton, a blend of Lyocell and cotton, a blend of cotton and bamboo, a blend of cotton and sea weed, a blend of cotton and silver, a blend of cotton and charcoal, and a blend of cotton and modal, or any combination thereof.

Figure 1B:
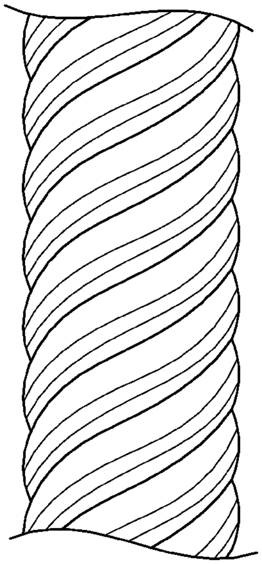
FIG. 1B (PRIOR ART)
Figure 1C:
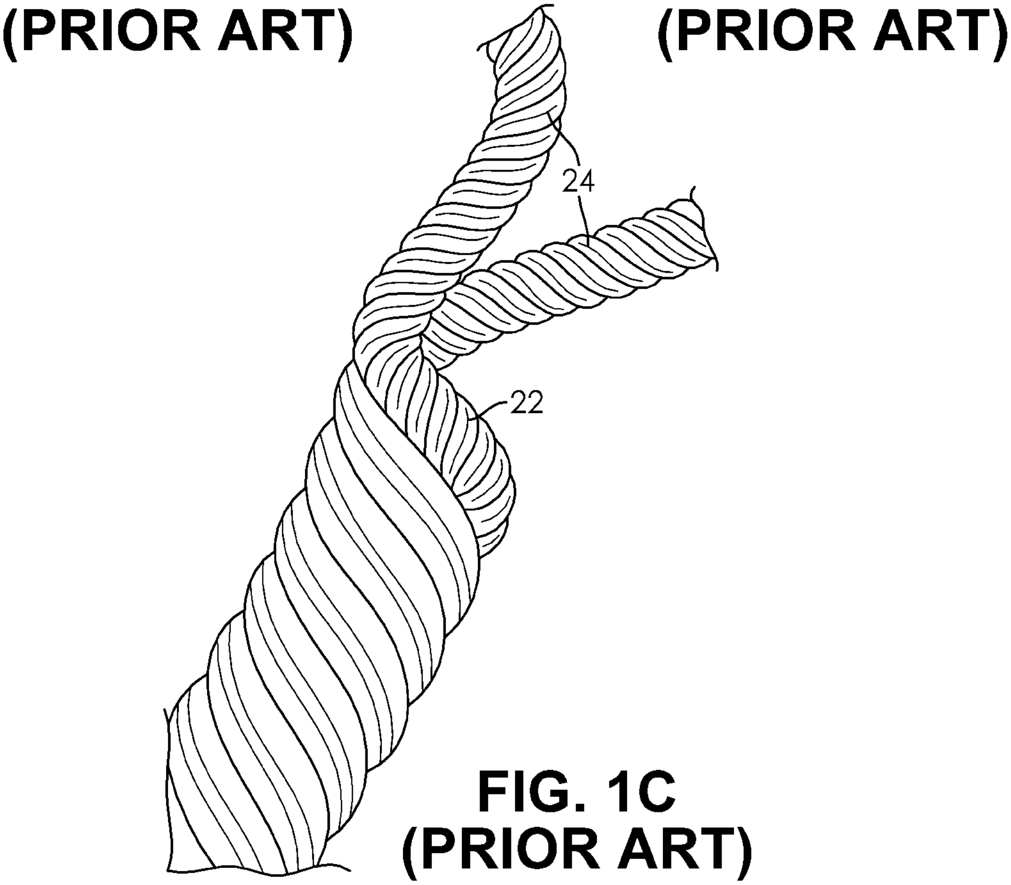
FIG. 1C (PRIOR ART)

Referring now to the figures, FIGS. 1A-1C illustrate prior art examples of an S-twist yarn, a Z-twist yarn, and a 2-ply S/Z hybrid twist with an S-twist component 22 and a Z-twist component 24, respectively. Twist patterns used in embodiments of the present invention include S twist, Z twist, and sZ twist as will be detailed hereafter. sZ twist refers to a fiber where a direction of twist changes at intervals along a fiber.

Figure 2A:
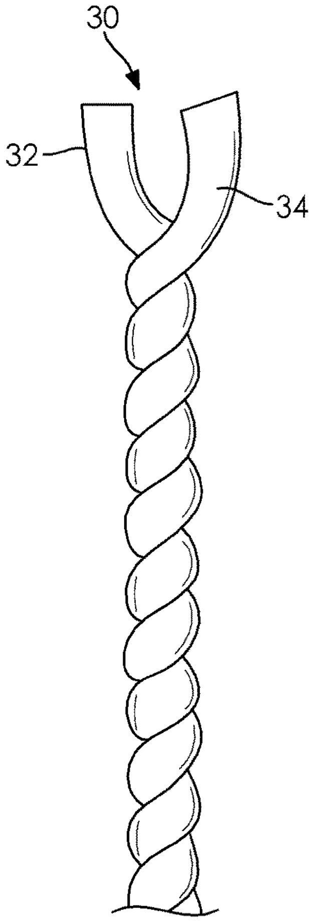
FIGS. 2A-2C are partial unwound inventive yarns using an Z-twist that are 2-ply (FIG. 2A), 3-ply (FIG. 2B), or 4-ply (FIG. 2C)
Figure 2B:
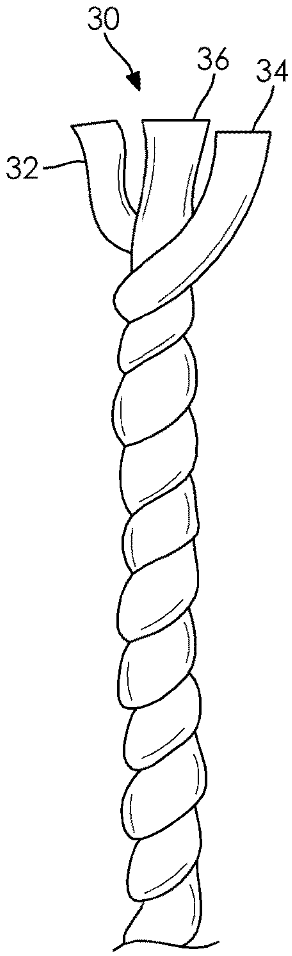
Figure 2C:
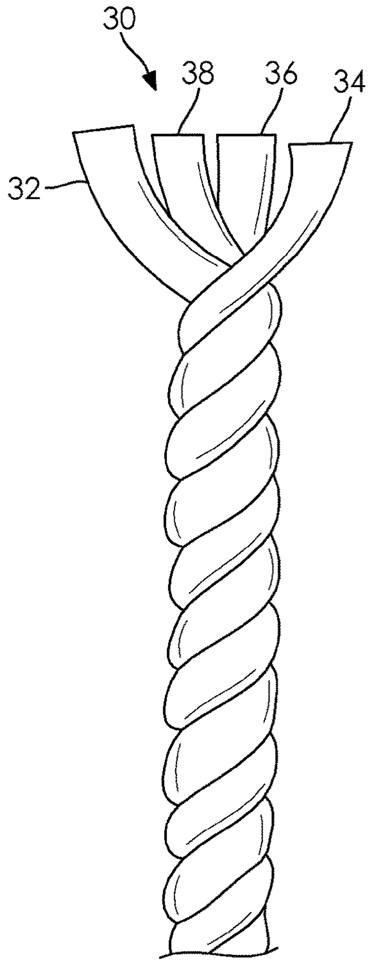
Figure 3A:
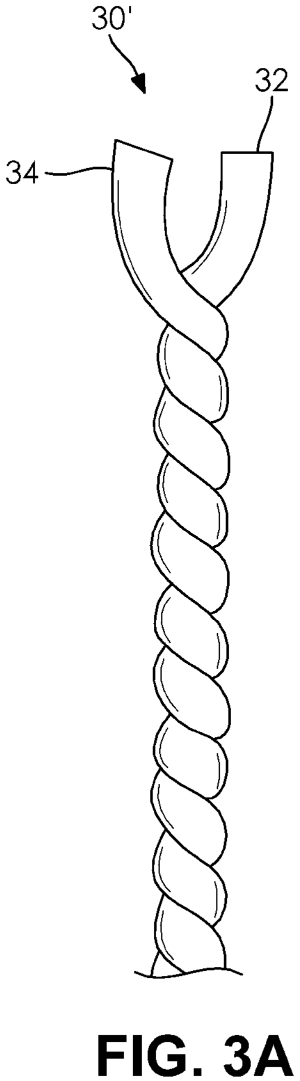
FIGS. 3A-3C are partial unwound inventive yarns using an S-twist that are 2-ply (FIG. 1A), 3-ply (FIG. 1B), or 4-ply (FIG. 1C)
Figure 3B:
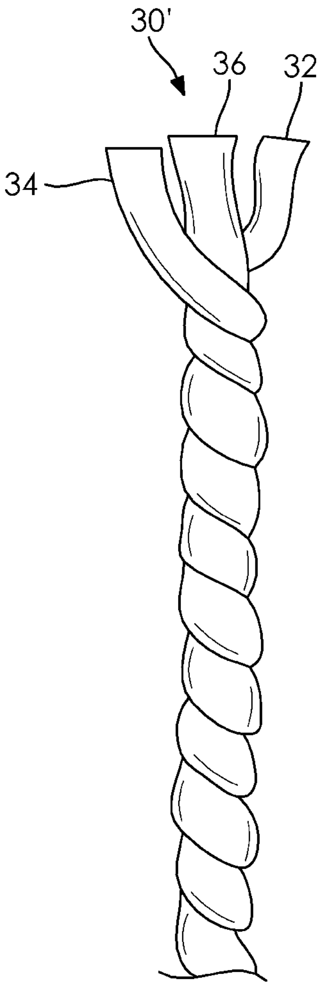
Figure 3C:
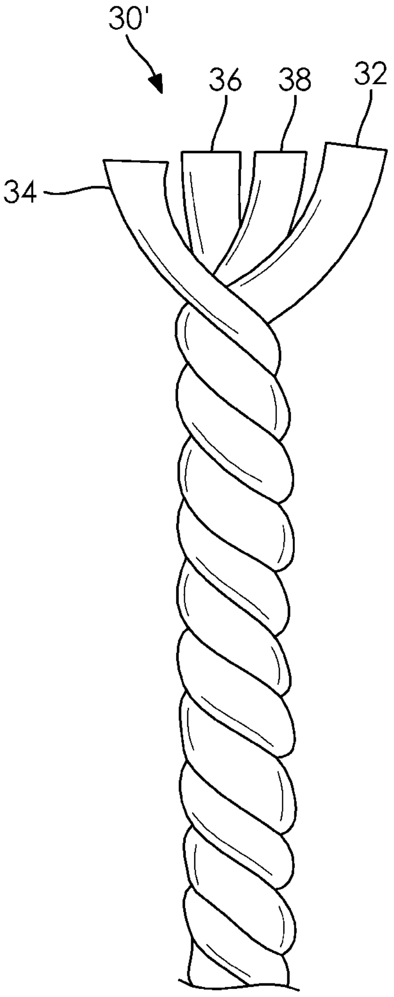

According to some inventive embodiments, embodiments of the inventive yarn 30 that are formed as a blend of soluble fibers 32 and non-soluble fibers 34 may be combined with other yarns 36, 38 and twisted as shown in FIGS. 2A-2C that are 2-ply, 3-ply yarn, and 4-ply yarns, respectively, all using a Z-twist. Alternatively, as shown in FIGS. 3A-3C a specialized yarn 30' that are 2-ply, 3-ply, and 4-ply yarns, respectively, all using a S-twist. It is appreciated that the use of multiple ply yarns adds additional bulk, strength, and/or absorbency that can be provided in the finished fabric. It is appreciated that the present invention is amenable to extension from 2, 3, or 4-ply yarns to n-ply yarns, where n is an integer value ranging from 5 to 48 by combining more fibers according to the present invention without departing from the concepts of the invention detailed. While the figures shown approximately equal fiber diameters and amounts, it is appreciated that an article is readily formed by weaving inventive yarns with conventional yarns to balance degradation and wear properties of the resulting woven article.

Figure 4A:
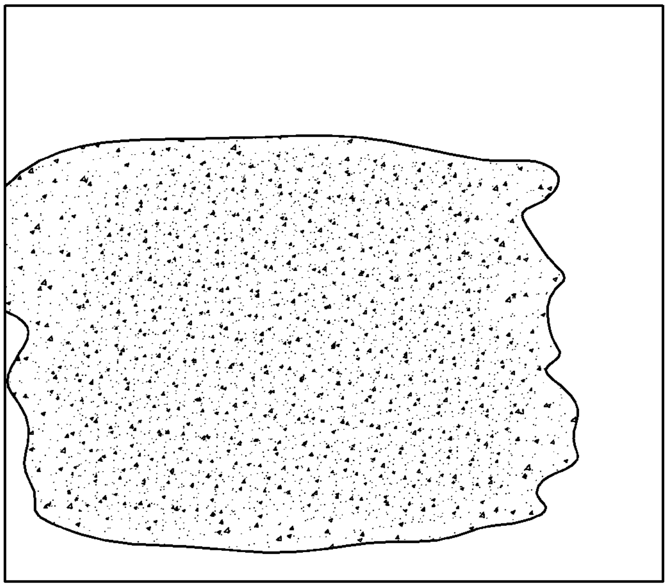
FIG. 4A (PRIOR ART)
FIGS. 4A and 4B illustrate a prior art 1:1 comparison of the fiber lengths of Upland cottons and extra-long staple (ELS) cottons.
Figure 4B:
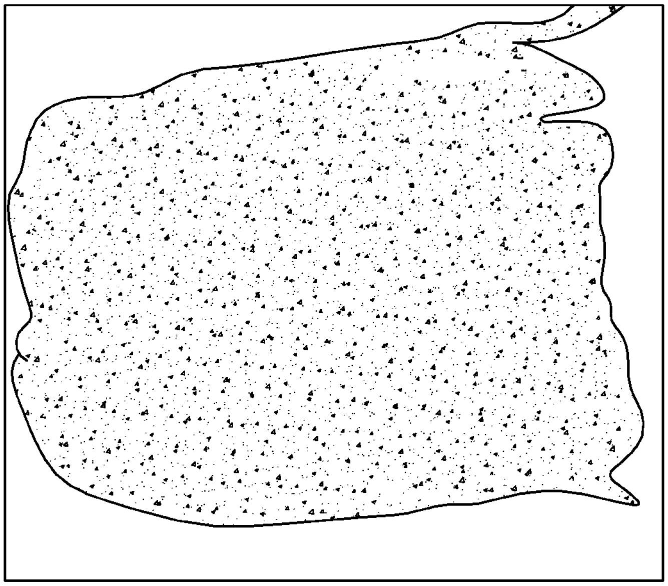
FIG. 4B (PRIOR ART)

In specific embodiments of the invention, the insoluble fiber may be an extra-long staple (ELS) cotton that typically denotes a cotton fiber of extraordinary fiber length. The recognized industry standard for the minimum fiber length of an ELS fiber is 34.925 mm, and fiber lengths of between 10 mm and 100 mm maybe used in embodiments of the invention. This minimum is significantly longer than traditional varieties of cotton, known as Upland cottons, where the staple fiber length averages 26-27 mm. ELS varieties, by comparison, can see fiber lengths exceed 40 mm at the top end. FIGS. 4A and 4B illustrate a 1:1 comparison of the fiber lengths of Upland cottons and ELS cottons, respectively. As can be seen in FIG. 4A strands of regular cotton (Upland) are shorter then strands of ELS cotton as shown in FIG. 4B. ELS cottons are also recognized for their superior strength and better uniformity. In embodiments of the invention natural fibers such as cotton have an average cut length of 38 mm. In embodiments of the invention any fiber material and any staple length being short or long staple length may be used depending on the drawing system used to form the yarn and the final strength required.

ELS cotton may be used in specific embodiments of the inventive disposable thread for ease of recycling. The extra-long staple fiber gives the cotton its premium properties of strength, softness, and color retention. ELS cotton is twice as strong as regular cotton, which makes for extraordinarily resilient products. The longer fiber resists pulling, breaking and tearing resulting in fashion and home products that are incredibly resilient and keep their form for a longer-lasting product. ELS cotton is inherently softer and more luxurious due to its extra-long staple fiber as compared to regular cotton. The additional length of the fiber makes for a smoother surface and produces a softer fabric that resists pilling. Products formed with ELS cotton generally feel sumptuously soft and usually get softer with time. The finer fibers that are inherent to ELS cotton absorb dye better with a deeper, long-lasting penetration. The result is a product that retains color better than regular cottons, and products made with ELS cotton keep their brilliance wash after wash and provide many years of use.

A dye, which is capable of reacting chemically with a substrate to form a covalent dye substrate linkage, is known as reactive dye. For example, a reactive dye contains a reactive group and this reactive group makes a covalent bond with the fiber polymer and acts as an integral part of the fiber. This covalent bond is formed between the dye molecules and the terminal —OH (hydroxyl) group of cellulosic fibers on between the dye molecules and the terminal —NH2 (amino) group of polyamide or wool fibers. Embodiments of the inventive disposable thread may be dyed with conventional reactive dyestuffs illustratively including direct dyes illustratively including unmetallized azo structures, disazo, or polyazo types; or Indanthrene dyestuff. Dyeing occurs at temperatures under 60° C. in some inventive embodiments, or in other inventive embodiments at least 20° C. less than the dissolution temperature of the fiber or dying.

A lubricant may be used to be able to obtain lower friction for the operations conducted during the formation of the yarns made of the mixed water dissolvable fibers and non-dissolvable fibers illustratively includes silicones, polyalkylene glycols, mineral oils, and combinations thereof. A lubricant is used herein to produce low yarn/yarn and yarn/yarn guide (metal, ceramic) friction. A lubricant is typically applied from a coating bath and applied in an amount of between 3-10 total weight percent of the dried fiber leaving the coating bath.

Figure 5A:
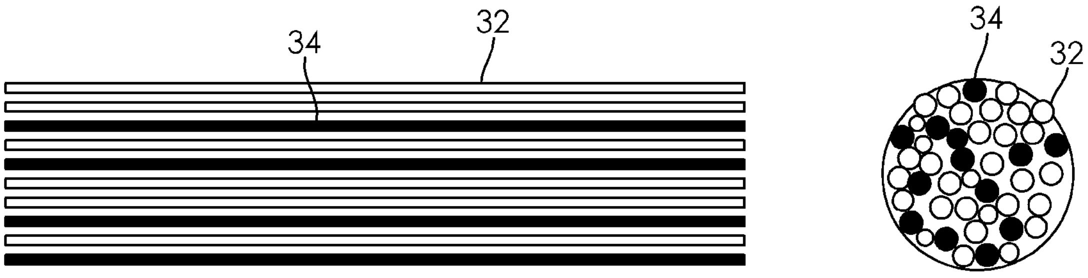
FIG. 5A illustrates a mixture of blended soluble and non-soluble fibers laid end to end to form a mixed yarn in accordance with an embodiment of the invention.
Figure 5B:
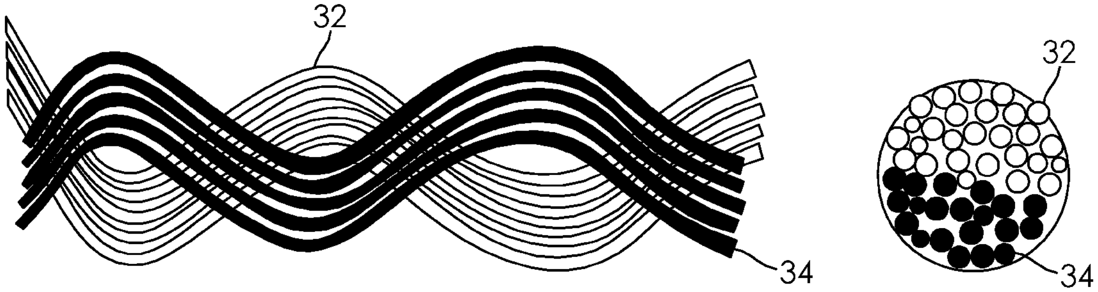
FIG. 5B illustrates separate soluble and non-soluble fibers twisted together to form a yarn in accordance with an embodiment of the invention.

In specific inventive embodiments a mixture of blended soluble and non-soluble fibers are laid end to end to form a mixed yarn with a length of soluble fiber adjacent to lengths of non-soluble fiber to form an inventive yarn. In FIG. 5A soluble and non-soluble fiber are depicted generally parallel and untwisted. FIG. 5B illustrates soluble and non-soluble fiber twisted together to form a yarn. In FIGS. 5A and 5B, the soluble fibers 32 are shown in white and the non-soluble fibers 34 are shown in black.

In some inventive embodiments, an article is formed by at least two swatches being sewn together with a thread formed according to the present invention, as shown for example in FIGS. 2A-3C, or FIG. 5A or 5B, is amenable to being recycled upon thread dissolution into constituent pieces without resort to the need for mechanical thread cutting.

During a recycling or disposal process a woven article, garment or textile made with the inventive dissolvable thread is subjected to conditions that cause the dissolvable fiber to lose long range order. Such conditions illustratively include wash in at an elevated water temperature range above with which the woven article, garment or textile is normally washed alone, chemical reaction to remove protecting groups or a coating, or catalytic cleavage through aqueous contact with a synthetic or enzymatic catalyst, or a combination thereof. As a result of exposure to dissolution conditions, the woven article, garment or textile begins to separate into individual insoluble fibers, and a slurry or solution material derived from the dissolved fibers. Additionally, with the dissolution of the dissolvable fiber component, the thread or yarn formed therefrom readily loses integrity as only the insoluble fiber remains.

It is appreciated that a liquid at high pressure has a higher boiling point than when that liquid is at atmospheric pressure. For example, water boils at 100° C. at sea level, but at 93.4° C. at 1,905 meters altitude. For a given pressure, different liquids will boil at different temperatures. This pressure versus temperature property may be used to affect the temperature at which embodiments of the threads of the woven garment begin to become soluble and the garment begins to separate. While the dissolution temperatures detailed herein assume standard pressure of 1 atmosphere, it is appreciated that resort to different pressures changes the dissolution rates and/or temperatures.

Figure 6:
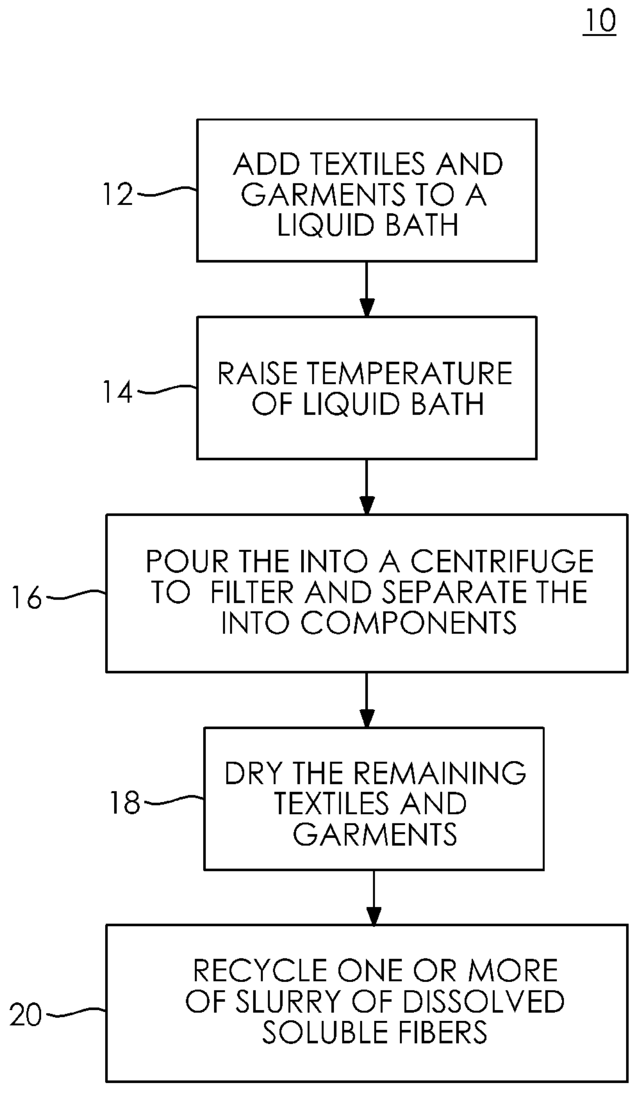
FIG. 6 is a flowchart of a method for recycling of textiles and garments made with soluble fibers in accordance with an embodiment of the invention.

During a high temperature wash for dissolving the portion of the yarn made of dissolvable fibers a filtering process may be used to separate metal and plastic components, such as stitching, labels, zippers, grommets, fasteners, and combinations thereof that detach from the garment during the wash. Separating devices known in the art such as centrifuges equipped with filters and magnets may be used during the separation process to harvest the ferromagnetic metals and plastics such as zippers, snaps, and buttons. FIG. 6 is a flowchart of an embodiment of a method 10 for recycling of textiles and garments made with soluble fibers. The process starts by adding textiles and garments made of soluble and insoluble fibers to be recycled into a liquid bath (Block 12) and raising the temperature of the liquid bath to dissolve soluble fibers into a slurry (Block 14). Pouring a mixture of insoluble fibers, slurry of dissolved soluble fibers, and metal and plastic parts into a centrifuge to filter and separate the mixture into components (Block 16). A drying process (Block 18) is used to dry the garment and allow for the manual removal of any remaining plastic and metal parts via gentle hand forces as the retaining stitching has been dissolved. The process concludes by recycling the one or more components of slurry of dissolved soluble fibers into new soluble fibers, non-soluble fibers into yarn, collected plastic and metal parts (Block 20).

In a specific inventive embodiment, enzymes may be employed to dissolve fibers including a cleavage site complementary to the active site of the enzyme. For example, textiles and garments may be put in a water bath with enzymes and/or microbes under conditions that facilitate enzymatic or microbial cleavage of the dissolvable fiber component to render the woven article, garment, or textile containing such fibers recyclable. It is appreciated that catalytic dissolution using an enzyme requires minimal heating and generally occurs in an aqueous bath at temperatures below 40° C. By way of example, PVA fibers are readily cleaved by PVA dehydrogenase expressed by organisms such as *Alcaligenes faecalis*. Corti, A., Solaro, R. and Chiellini, E., 2002. Biodegradation of poly(vinyl alcohol) in selected mixed microbial culture and relevant culture filtrate. Polymer Degradation and Stability, 75(3), pp. 447-458.

EXAMPLES

Example 1

Samples of an embodiment of the disposable thread made with Supima Cotton with an average cut length of 38 mm and polyvinyl alcohol (PVA) with 1.7 dtex denier per fiber/38 mm average length of the cut fibers are made in the following size ranges: 190×2 dtex, 190×3 dtex, and 300×3 dtex. Table 1 summarizes the properties of the resulting samples.

TABLE 1

Test results for recylable thread.

| Sample No | Description | Size dtex | Strength dyne | Strength CV % | Tenacity cN/Tex | Elongation % | Single Twist | Final Twist | Direction |
|---|---|---|---|---|---|---|---|---|---|
| 1 | 190 × 2 Natural | 381 | 1116 | 14 | 29 | 9 | 758 | 689 | sZ |
| | 190 × 2 Black | 403 | 1007 | 7 | 25 | 17 | 825 | 733 | sZ |
| 2 | 190 × 3 Natural | 558 | 1723 | 6 | 31 | 10 | 749 | 599 | sZ |
| | 190 × 3 Black | 612 | 1550 | 7 | 25 | 19 | 828 | 669 | sZ |
| 3 | 300 × 3 Natural | 972 | 3102 | 4 | 32 | 12 | 603 | 483 | sZ |
| | 300 × 3 Black | 1118 | 2871 | 2 | 26 | 22 | 628 | 493 | sZ |

The resulting dissolvable threads are woven into a fabric as stitching to secure labels, buttons, zippers, and other attached features to the garment. As noted above the dissolvable threads facilitate separation of the garment features during recycling

Example 2

The process of Example 2 is repeated with like dtex polyacrylic acid (PAA) in place of PVA with similar dissolution profiles.

Example 3

The process of Example 2 is repeated with like dtex polycaprolactone in place of PVA with similar dissolution profiles.

The foregoing description is illustrative of particular embodiments of the invention, but is not meant to be a limitation upon the practice thereof. The following claims, including all equivalents thereof, are intended to define the scope of the invention.

The invention claimed is:

1. A recyclable thread or yarn incorporated into a woven article, garment or textile, the recyclable thread or yarn comprising:

a dissolvable fiber; and an insoluble fiber, said dissolvable fiber and said insoluble fiber twisted around one another to define an axis around which both said dissolvable fiber and said insoluble fiber are twisted to form the yarn with one of an S twist Lor a Z twist, or at least two of the yarns twisted around one another to form the thread with one of a an sZ or zS twist.

2. The recyclable thread or yarn of claim 1 wherein said dissolvable fiber is a synthetic water soluble polymer.

3. The recyclable thread or yarn of claim 2 wherein said synthetic water soluble polymer is at least one of polydioxanone, poly(ethylene glycol) (PEG), polyvinyl pyrrolidone (PVP), polyvinyl alcohol (PVA), polyacrylic acid (PAA), polyglycolic acid, polyacrylamide, N-(2-Hydroxypropyl) methacrylamide (HPMA), divinyl ether-maleic anhydride (DIVEMA), polyoxazoline, poly(caprolactone), polyphosphate, or polyphosphazenes.

4. The recyclable thread or yarn of claim 1 wherein said dissolvable fiber is only polyvinyl alcohol (PVA).

5. The recyclable thread or yarn of claim 1 wherein said dissolvable fiber is a naturally occurring water soluble polymer that is at least one of: plant ucilage, water-soluble hemicellulose, inulin, alginates, dextrins, maltodextrins, galactommannans, arabanogalactans, beta glucans, cellulose ethers, pectins, pectic material, dextran, and partially hydrolyzed products thereof or mixtures thereof.

6. The recyclable thread or yarn of claim 1 wherein said insoluble fiber is cotton.

7. The recyclable thread or yarn of 6 wherein said cotton is an extra-long staple (ELS) cotton.

8. The recyclable thread or yarn of claim 7 wherein said extra-long staple (ELS) cotton is a pima cotton.

9. The recyclable thread or yarn of claim 1 wherein insoluble fiber is at least one of: cotton, silk, modal, acrylics, a blend of cotton and polyester, a blend of polyester and viscose, a blend of poly(trimethylene terephthalate) and cotton, a blend of Lyocell and cotton, a blend of cotton and bamboo, a blend of cotton and sea weed, a blend of cotton and silver, a blend of cotton and charcoal, and a blend of cotton and modal or any combination thereof.

10. The recyclable thread or yarn of claim 1 wherein said dissolvable fiber dissolves in water at between 60° C. and 100° C.

11. The recyclable thread or yarn of claim 1 wherein said dissolvable fiber ranges between 100 dtex to 3000 dtex.

12. The recyclable thread or yarn of claim 1 wherein a blending ratio of said dissolvable fiber to said insoluble fiber ranges between 0.1-9:1.

13. The recyclable thread or yarn of claim 1 further comprising a lubricant or a dye.

14. The recyclable thread or yarn of claim 1 further comprising a plurality of like enzymatic cleavage sites on said dissolvable fiber.

15. The recyclable thread or yarn of claim 1 further comprising a water insoluble barrier coating on said dissolvable fiber that is selectively compromised.

16. A woven article, garment or textile formed comprising at least two swatches sewn with the recyclable thread or yarn of claim 1.

17. A process for recycling a woven article, garment or textile made with recyclable thread or yarn of claim 1 comprising:

subjecting the woven article, garment or textile in water to a condition to cause said dissolvable fiber to lose long range order to form a slurry or solution.

18. The process of claim 17 wherein said condition is washing in an aqueous solution at an elevated temperature range sufficient to induce dissolution of said dissolvable fiber, chemical reaction to remove protecting groups or a coating from said dissolvable fiber, catalytic cleavage through aqueous contact with a synthetic or enzymatic catalyst, or a combination thereof.

* * * * *